United States Patent [19]
Jara et al.

[11] Patent Number: 5,960,703
[45] Date of Patent: Oct. 5, 1999

[54] HIGH PERFORMANCE COOKING OVEN WITH STEAM CHAMBER

[75] Inventors: Bruce C. Jara; Anthony Kootsouradis, both of Amherst; Ramesh M. Gunawardena, Solon, all of Ohio

[73] Assignee: Stein, Inc., Sandusky, Ohio

[21] Appl. No.: 08/631,951

[22] Filed: Apr. 15, 1996

Related U.S. Application Data

[63] Continuation-in-part of application No. 08/086,669, Jul. 1, 1993, Pat. No. 5,609,095.

[51] Int. Cl.⁶ ...................................................... A23L 3/16
[52] U.S. Cl. .............................. 99/331; 99/386; 99/443 C
[58] Field of Search ................................ 99/331, 443 C, 99/468, 477, 479, 482, 386; 126/21 A; 219/388; 426/510, 511, 231, 232

[56] References Cited

U.S. PATENT DOCUMENTS

| | | | |
|---|---|---|---|
| 3,982,481 | 9/1976 | Console et al. ............................ | 99/477 |
| 4,556,572 | 12/1985 | Kaufman, Jr. .......................... | 426/511 |
| 4,862,794 | 9/1989 | Lapeyre ................................. | 99/443 C |
| 5,072,663 | 12/1991 | Ellis-Brown .............................. | 99/468 |
| 5,075,120 | 12/1991 | Leary ...................................... | 426/510 |
| 5,184,538 | 2/1993 | Ledet ....................................... | 99/468 |

*Primary Examiner*—Randall E. Chin
*Attorney, Agent, or Firm*—Oldham & Oldham Co., L.P.A.

[57] ABSTRACT

The method and apparatus of the invention describes an oven having a housing formed by an enclosure, the enclosure having a cooking chamber in a portion thereof. The oven housing may also include an inlet and outlet positioned in predetermined relationship to the cooking chamber and a conveyor belt on which food products to be cooked are positioned. The conveyor belt travels through the oven housing from the inlet to the outlet and defines over a separate portion thereof a conveyance path through the cooking chamber. The oven further includes at least a source of steam for creating a cooking atmosphere in the cooking chamber. The cooking chamber of the oven is defined at its lower limit by the level of steam within the housing and the inlet and outlet are positioned below this lower limit to maintain the steam within the cooking chamber. In this manner, the escape of steam from the cooking chamber is substantially prevented or controlled. There may also be provided a temperature or steam sensing or measuring system, which can be used to maintain the desired steam atmosphere within the cooking chamber. Such an arrangement allows precise control of the flow rate of steam into the cooking chamber to thereby control the level of the steam cloud within the oven using a minimum amount of steam. Maintaining the desired steam level includes maintaining the steam density constant within the cooking chamber regardless of product flow into the oven. The oven may also include a steam recovery or containment system to minimize any loss of steam from the oven. In a preferred embodiment, the oven has an elongated opening in which the housing comprises a stationary base and a vertically reciprocable hood thereabove and in which the length of the conveyance passed through the cooking chamber may be varied by vertically reciprocating the hood.

22 Claims, 8 Drawing Sheets

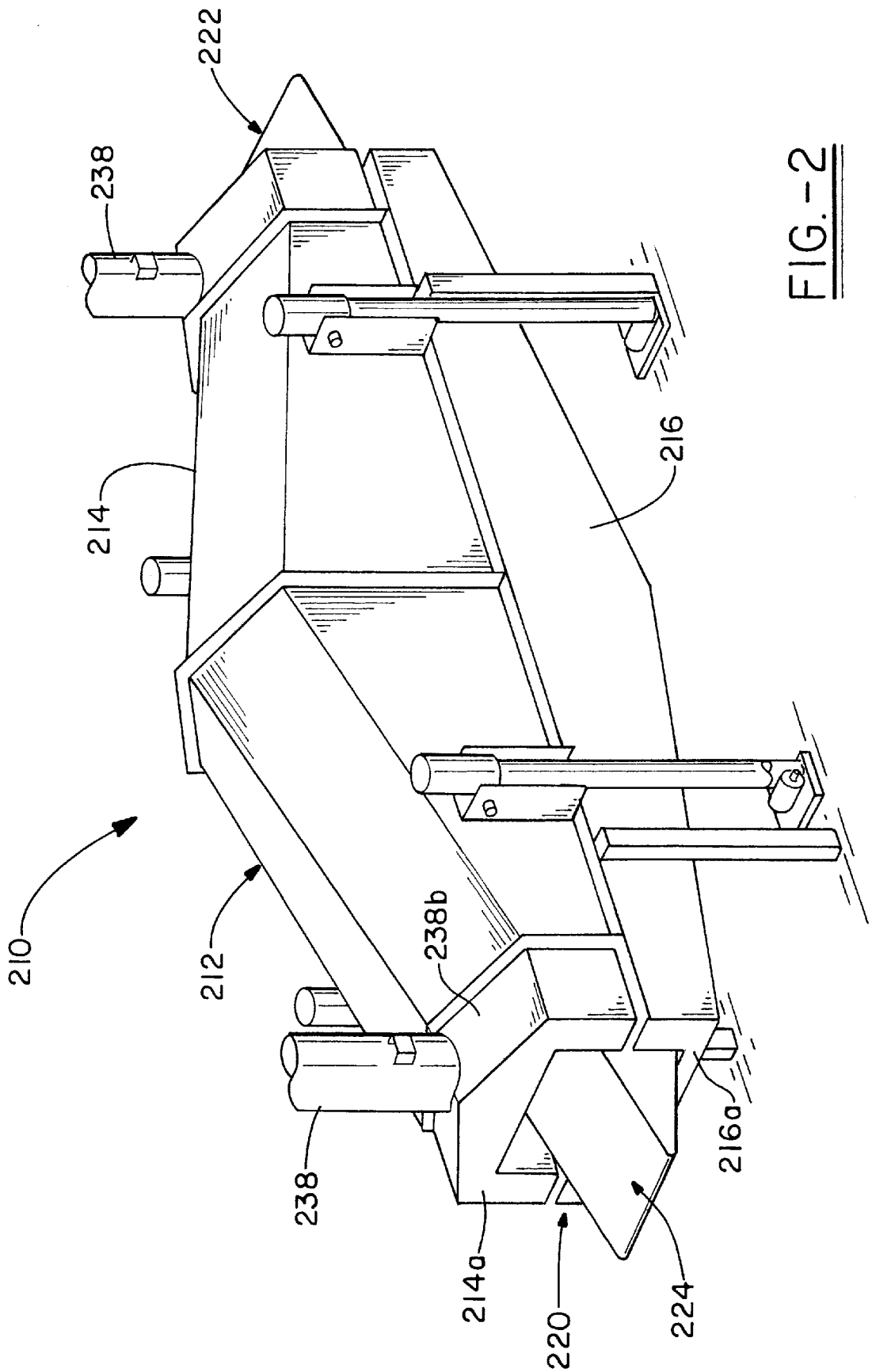

HIGH PERFORMANCE COOKING OVEN WITH STEAM CHAMBER

CROSS REFERENCE TO RELATED APPLICATIONS

This application is a Continuation-in-Part of application Ser. No. 08/086,669 filed Jul. 1, 1993, now U.S. Pat. No. 5,609,095.

TECHNICAL FIELD

This invention relates to a cooking oven and associated method of cooking for large scale food processing. More particularly, the invention is directed to a cooking oven and method for cooking wherein the oven includes a steam chamber acting as a containment chamber for maintaining a very high moisture level in the cooking atmosphere of the oven using a minimum amount of steam.

BACKGROUND OF THE INVENTION

In large scale food processing systems, a desired attribute of an oven is to provide desired cooking characteristics of particular food products as quickly as possible to obtain high throughput from the oven. In such ovens, a continuously running conveyor is conventionally used to introduce food products to the oven on a continuous basis, with the conveyor running from an entrance or inlet opening to an exit or outlet opening associated with the oven. Such systems have included use of both linear and spiral or helical conveyors. These ovens accommodate a large amount of food products therein, and provide the predetermined dwell time to allow thorough and complete cooking of any particular type of food product desired.

The cooking atmosphere of such ovens has been conventionally provided by means of burner units which introduced a heated gas cooking medium by means of a flame source, or alternatively by the introduction of steam into an oven chamber. For many applications, the moisture level in an oven is maintained by the injection of steam into the cooking atmosphere. In an oven atmosphere containing high steam content, significant heat losses are normally found at the entrance and exit locations of a continuous conveyor belt associated with the oven. Although attempts have been made to produce steam ovens having a cooking atmosphere with high humidity, such attempts have not resulted in an oven which optimizes efficient use of steam injected into the oven to transfer heat to food products introduced into the oven. In known oven configurations, attempts have been made to create a steam atmosphere near 212° F. and 100% humidity at one atmosphere, with such an atmosphere created by introducing large amounts of steam into the oven to produce an oven atmosphere at a pressure which is above atmospheric. Such ovens have included exhaust ducts at the location of the inlet and outlet areas of a conveyor belt associated with the oven, which exhausts escaping gases from the oven. Although attempts have been made to reduce losses of steam and heat energy from such an oven, such attempts have not resulted in systems which substantially reduce flow rates of steam from the oven to increase efficiency of performance and maintain introduced steam in the cooking atmosphere.

Other attempts at developing an oven which would enable a steam atmosphere of the above characteristics while operating at atmospheric pressure have not been wholly successful.

SUMMARY OF THE INVENTION

Based upon the foregoing, it is a main aspect of the present invention to provide a cooking oven including steam containment means for maintaining a substantially saturated steam processing environment within the cooking chamber of the oven, under atmospheric conditions. The invention affords improved process time and product yield, or less weight loss in the cooked resulting in increased throughput from the oven.

The apparatus and method of the invention desirably maintain the highest possible moisture level within the cooking chamber of the oven with the minimum amount of steam. To accomplish this, the oven of the invention comprises an elongated oven housing forming an enclosure, the enclosure having a cooking chamber in an upper portion thereof. The oven housing also includes an inlet and an outlet positioned at respective ends of the housing in relative spaced relationship to the cooking chamber defined therein. A continuous conveyor belt on which food products to be cooked are positioned travels through the oven housing from the inlet to the outlet and defines over a separate portion thereof a conveyance path through the cooking chamber. The oven further includes means to provide a saturated steam cooking medium in the portion of the housing corresponding to the cooking chamber. Such means include one or more steam inlets to an upper part of the cooking chamber between the ends of a housing and above a conveyor belt, and exhaust ducts at the ends of the housing. The cooking chamber of the oven is defined at its lower limit by the level of steam within the housing and the inlet and outlet are positioned below this lower limit to maintain the steam within the cooking chamber. In this manner, the escape of steam from the cooking chamber is substantially prevented as well as preventing the entry of air into the oven. There may also be positioned adjacent the product inlet and/or outlet a temperature or steam sensing means, which can be used to maintain the desired steam atmosphere within the cooking chamber. Such a sensing means allows precise control of the flow rate of steam into the cooking chamber to thereby control the level of the steam cloud within the oven using a minimum amount of steam. Maintaining the desired steam level includes maintaining the steam density constant within the cooking chamber regardless of product flow into the oven.

In an alternative embodiment, the cooking chamber will include a heated gaseous cooking medium having a predetermined amount of steam therein with means for the recovery of steam escaping from the inlet or outlet openings, being positioned adjacent and outside these openings in the oven housing. Steam escaping from the cooking chamber will be captured and recycled into the cooking chamber to substantially maintain the predetermined amount of steam within the cooking chamber. In this manner, the input of steam into this system is greatly reduced, thereby increasing cost effectiveness of the cooking operation and providing a saturated steam cooking atmosphere to allow cooking of food products in a shorter time and with less weight loss from the food product.

In a still further embodiment, an elongated housing having two halves, i.e., a hood or upper housing member which is vertically reciprocable, and a base or lower housing member which is stationary, are provided in order to make it possible to vary cooking time by varying the length of the path through a cooking chamber traversed by food products being cooked. In this embodiment, there is provided a conveyor belt defining a fixed path for food products. This path may include an ascending portion from the inlet end to a cooking chamber, and a descending portion from the cooking chamber to the outlet end. The cooking chamber is disposed in an upper portion of the hood, so that the cooking chamber, including the lower limits thereof, moves up and down with the hood. At least the upper portion, including the top edges of the inlet and outlet openings, are formed in the end walls of the hood. Exhaust ducts extend upwardly from the ends of the hood. The hood is preferably provided with transverse baffles at either end and spaced from the respective end walls, forming exhaust chambers with which the exhaust ducts communicate at either end. Steam is introduced into the cooking chamber, preferably into an upper portion thereof, between the ends of the cooking oven and above the conveyor belt. A deflector plate may be provided above the conveyor belt and below the level at which steam is introduced into the cooking chamber.

BRIEF DESCRIPTION OF THE DRAWINGS

The above and other aspects and advantages of the invention will become apparent upon a reading of the detailed description of the preferred embodiments in conjunction with the drawings wherein:

FIG. 2 is a perspective view of a cooking oven according to a further embodiment of this invention, in which an oven housing has a stationary lower housing member and a vertically reciprocable upper housing member.

DETAILED DESCRIPTION OF PREFERRED EMBODIMENTS

Figures 1, 1A:
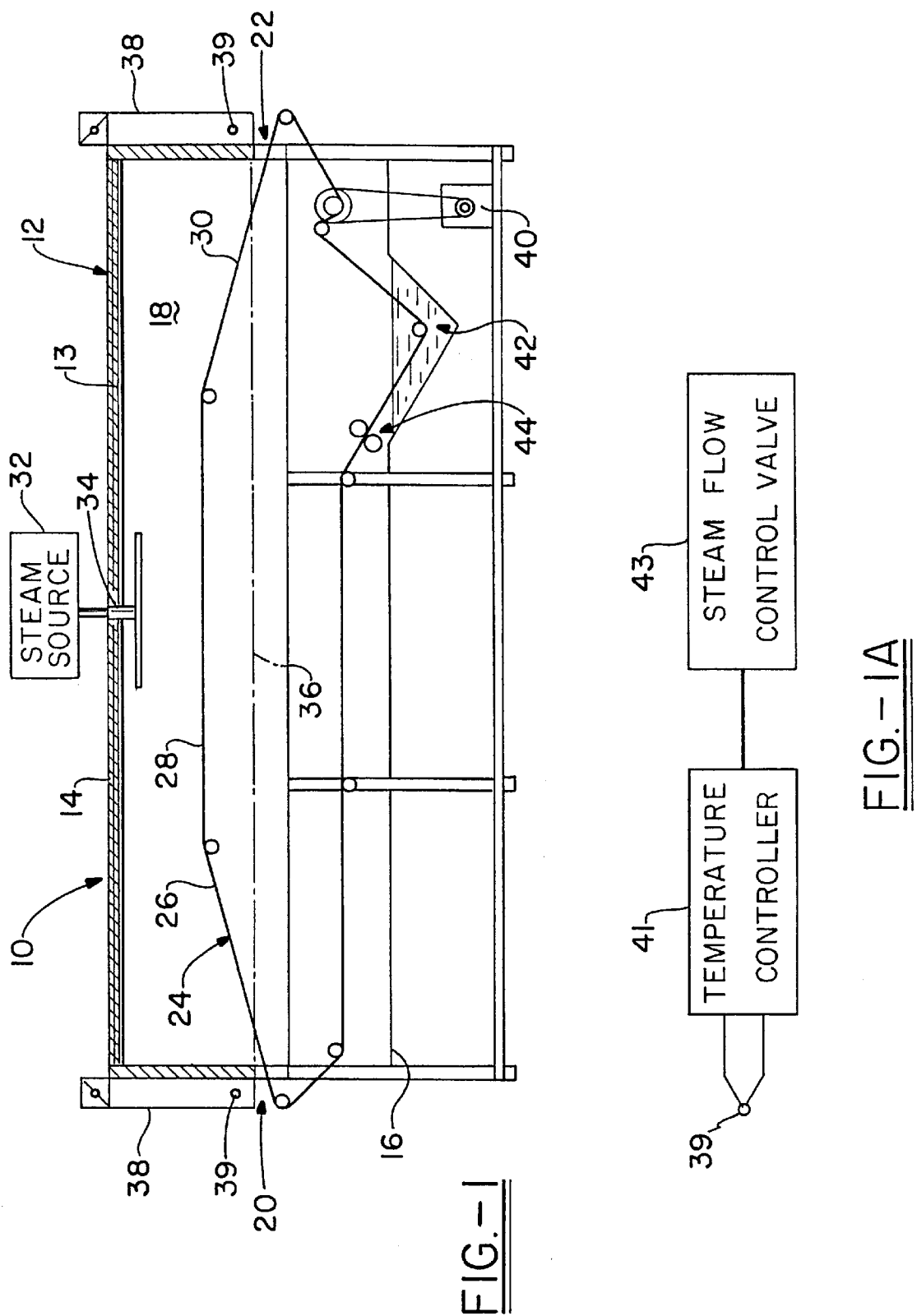
FIG. 1 is a schematic side elevational view of a cooking oven in accordance with the invention, using a linear conveyor therein.
FIG. 1a shows schematically a control means to regulate the flow of steam out of an opening in the oven housing.

Turning now to FIG. 1, a first embodiment of the invention is shown in schematic form, for a linear-type cooking oven. The cooking oven 10 comprises an oven housing defined by an enclosure 12 having a hood 14 and a base 16. The hood 14 may include means to lift the hood away from the base 16 for cleaning of the interior of the oven 10 as desired. When in an operating position, the hood member 14 is sealed with respect to base 16 to eliminate any loss of heat from the oven at the junction therebetween. This seal may be provided by a water jacket positioned about the exterior walls of the base 16 and an extending flange from hood member 14 which will extend into the water jacket and create a water seal. Other sealing arrangements are also contemplated such as balloon type seal wherein a member may be inflated against an extending flange to form a seal. The walls of the oven enclosure 12 are preferably double walls having an interior insulation 13 in the space therebetween. There will also be provided at least one inlet 20 and at least one outlet 22 through which food products are introduced and exit a cooking chamber 18 for the cooking of the food products. Food products may be introduced onto a conveyor belt 24, which may be an endless belt having an upper conveyor run having a large portion thereof traveling through the cooking chamber 18, and a return or lower belt run traveling through base 16 of the oven.

The inlet 20 and outlet 22 of the oven are preferably made as small as feasible to retard the egress of any heated gaseous cooking medium from the cooking chamber 18. The top of the uppermost of the openings 20 and 22 essentially defines the lower limit of the cooking chamber 18, as above these openings there is no possibility for escape of a heated gaseous cooking medium within the cooking chamber 18. The openings are therefore positioned below the lower limit of said cooking chamber. In the preferred embodiment, the upper run of the conveyor belt 24 will have a first segment or portion 26 extending from the inlet opening 20 upwardly into the cooking atmosphere of cooking chamber 18. A segment of the belt portion 26 will be below the lower extent of cooking chamber 18 and food products will be introduced onto belt 24 in this region. The food products will thereafter pass into the cooking of cooking chamber 18. In a steam oven it is desired to create a very high humidity, droplet free saturated steam atmosphere which approaches 100% humidity at a temperature of approximately 212° F., under atmospheric conditions. It has been found to be highly desirable to maintain this type of very high moisture and associated temperature in the cooking atmosphere of the oven 10, in order to allow cooking of food products in a shorter amount of time with less weight loss occurring during the cooking process. Within cooking chamber 18, a zone of approximately 100% saturated steam at 212° F. is created at ambient atmospheric pressure or one atmosphere, to obtain high rates of heat transfer to food product as it passes through the cooking chamber 18 to maximize product throughput and yield from the cooking process. A source of steam under pressure generally shown at 32 supplies steam to a steam inlet 34 which will distribute the steam within an upper region of hood member 14. The moisture level within cooking chamber 18 is maintained by injecting steam into the cooking atmosphere in order to substantially fill cooking chamber 18 with 100% saturated steam atmosphere. A feature of the invention is directed to maintaining the highest possible moisture level in the cooking chamber 18 with the minimum amount of steam to make the cooking process cost effective and efficient.

It is therefore an aspect of the invention to prevent the unwanted escape of steam from the oven as well as to prevent the entry of air into the cooking chamber 18. These goals can be achieved by utilizing the natural tendency of steam to separate from air due to its lower density, wherein steam introduced into hood 14 will be maintained in a leak-proof portion of the enclosure 12 corresponding to the region above the inlet and outlet openings 20 and 22 respectively. As shown in FIG. 1, the lower extent of the steam is shown at 36, defining the lower limit of the cooking chamber 18 through which food products are made to pass. The product inlet and outlet openings 20 and 22 are the highest openings in the oven cabinet or enclosure 12, and thus the only place for steam within the cooking chamber 18 to escape from the oven. The lower limit of the cooking chamber is therefore above the openings 20 and 22. To maintain the high moisture level within the cooking chamber 18, introduction of steam from source 32 through steam inlet 34 may be continued after the cooking atmosphere is of approximately 100% saturated steam, to create a very small amount of steam leakage at the highest openings of the enclosure 12. This will ensure that the cooking chamber 18 is substantially filled with steam continuously. An exhaust stack 38 is provided at each of the inlet and outlet openings 20 and 22 for collection of the small amount of escaping steam. Within the exhaust stacks 38, there may be provided a temperature or steam sensing means 39, such as a thermocouple. By providing the sensing means at this location relative to any steam loss from the oven, it is possible to use an output signal from the sensor 39 to precisely control the flow rate of steam into the chamber 18 from the steam source 32. The steam flow rate from the openings 20 or 22 can be reduced until only a small amount exits the oven 10, while maintaining the level of steam or steam density constant regardless of product flow into the oven.

Figure 1B:
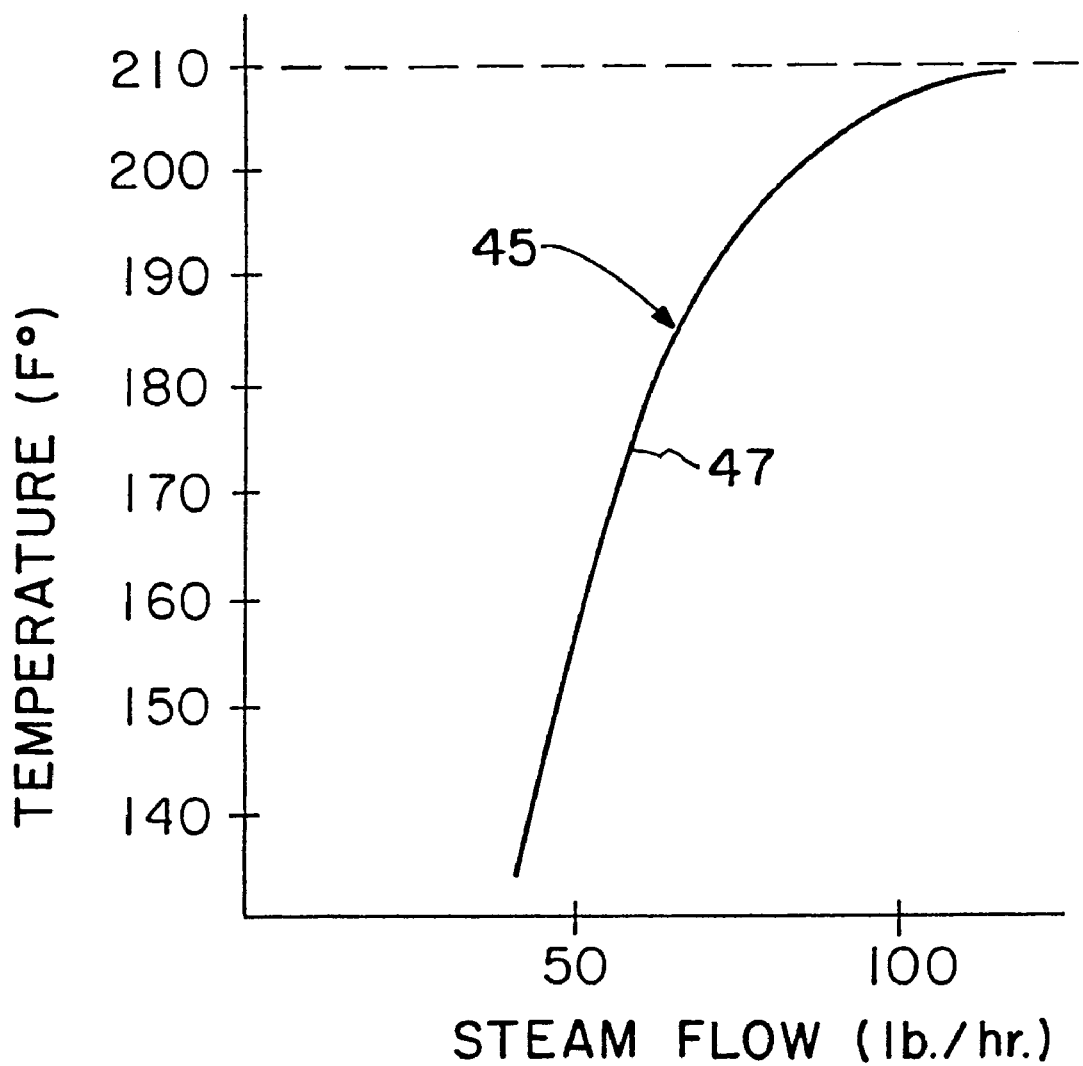
FIG. 1b shows a plot of temperature vs. steam flow in operation of the oven.

In operation, after the cooking atmosphere of approximately 100% saturated steam is created within cooking chamber 18, food products can be loaded onto conveyor belt 24 at the inlet opening 20, from which they will travel upwardly on portion 26 of the belt into the saturated steam cooking atmosphere within cooking chamber 18. Before food products are loaded onto the conveyor 24, the steam flow rate into the oven is automatically controlled to just maintain the level of steam in the chamber. Upon loading of the conveyor with food products, due to the products significantly lower temperature, being ambient temperature for fresh food products and possibly frozen products, the steam within chamber 18 will begin to condense onto the food products, and the amount of steam flowing out of the oven will diminish. This will be monitored by the sensors 39, and the flow of steam into the oven from source 32 will be automatically adjusted to compensate for product flow into the oven to maintain the desired saturated steam atmosphere with the minimum amount of steam. As seen in FIG. 1a, control of the flow rate of steam may be accomplished by means of a controller 41, such as a temperature controller, coupled to the sensing means 39, which may be a thermocouple to monitor the temperature of escaping gases from the oven. The controller 41 may then be coupled to a steam flow control valve 43 to precisely control the flow rate of steam into chamber 18. The arrangement will allow automatic control over steam flow rate to maintain the desired cooking atmosphere and constant steam density regardless of product flow into the oven. In a preferred method of operation, it has been found that the control arrangement of FIG. 1a can automatically control steam flow rate as desired by monitoring the temperature of escaping gases from the inlet and/or outlet openings 20 and 22. In analyzing steam flow rate into the oven, the plot of FIG. 1b shows temperature versus steam flow rate into the oven. It has been found that it is desirable to control the flow rate of steam at a point along the linear portion 47 of the curve 45. As an example, a thermocouple can be positioned relative to the openings 20 and 22 to monitor the temperature of escaping gases, such that a temperature of 150° F. will correspond to the saturated steam atmosphere desired. This temperature falls at approximately the center of the linear portion 47 of the curve 45 as seen in FIG. 1b. Steam flow rate may thereafter be automatically controlled, such as by the arrangement shown in FIG. 1a, to maintain this temperature of escaping gases regardless of product flow into the oven. If product flow into the oven decreases, the flow rate of steam will automatically throttle back, and as product flow increases, the flow rate will correspondingly increase. It should be recognized that other sensor and control arrangements are possible, and are contemplated within the scope of the invention.

Upon introducing food products into the oven, they will be disposed within the saturated steam cooking atmosphere of cooking chamber 18 over a large portion of their path within the oven to maintain high heat transfer and moisture levels of the products during cooking. In this oven, the throughput of food products may be significantly increased as cooking times can be significantly decreased to maximize operation of the oven. After cooking, the food products will travel downwardly out of the 100% saturated steam cooking atmosphere of cooking chamber 18 on portion 30 of belt 34 to the outlet opening 22 of the oven. Food products discharged from the oven at opening 22 are ready for further processing in any desired manner. The conveyor belt 24 is made to continuously travel through the oven by means of an adjustable drive 40, and after discharging food products at outlet opening 22 will be made to pass through a belt wash region 42 and scrubbing brushes 44 for cleaning of the belt.

Turning now to FIGS. 2–7, another preferred embodiment of the invention is shown. This embodiment is directed to an elongated linear oven which includes a vertically reciprocable hood and a stationary base, wherein the hood is vertically reciprocable for the purpose of varying the effective length of the portion of a conveyor belt run for food articles which lies within a cooking chamber. This permits an operator to vary the cooking time either by moving the hood up or down, which changes the length of the portion of the food path which lies inside the cooking chamber, or by varying the conveyor belt speed or both.

In FIGS. 2–7, the steam oven is shown in schematic form, for a linear-type cooking oven. The cooking oven 210 comprises an oven housing defining an enclosure 212 and having a vertically reciprocable hood 214 and a stationary base 216. The hood 214 may include means, such a motor-driven screw jacks, to reciprocate the hood vertically toward and away from the base 216. The hood member 214 is sealed with respect to base 216 to eliminate any loss of heat from the oven at the junction therebetween. This seal may be provided by a water jacket positioned about the exterior walls of the base 216 and an extending flange from hood member 214 which will extend into the water jacket and create a water seal 217. The walls of the oven enclosure 212 are preferably double walls having interior insulation in the space therebetween, as shown in FIG. 1. There will also be provided at least one inlet 220 and at least one outlet 222 through which food products are introduced and exit. Inlet 220 and outlet 222 may be formed in end walls 214a and 216a of hood 214 and base 216. The upper portions, including the tops or upper edges of the inlet 220 and outlet 222, are formed in the end walls 214a of hood 214.

A cooking chamber 218 for the cooking of the food products as provide in an upper portion of enclosure 212 above the tops of inlets 220 and outlets 222. Food products may be introduced onto a conveyor belt 224, which may be an endless belt having an upper conveyor run having a large portion thereof traveling through the cooking chamber 218, and a return or lower belt run traveling through base 216 of the oven.

The inlet 220 and outlet 222 of the oven are preferably made as small as feasible to retard the egress of any heated gaseous cooking medium from the cooking chamber 218. The tops of the openings 220 and 222 essentially defines the lower limit of the cooking chamber 218, as above these openings there is no possibility for escape of a heated gaseous cooking medium within the cooking chamber 218. The openings are therefore positioned below the lower limit of said cooking chamber.

In the preferred embodiment, the upper run of the conveyor belt 224 will have a first portion 226 extending from the inlet opening 220 upwardly into the cooking atmosphere of cooking chamber 218, a horizontal second portion 228 which lies entirely within cooking chamber 218, and a third portion 230 which extends downwardly from the cooking chamber 218 to the outlet opening 222. The horizontal middle or second portion 228 may be omitted in which case the third or descending portion 230 of the upper run of conveyor belt 224 follows immediately after the first or ascending portion 226.

A segment of the belt portion 226 will be below the lower extent of cooking chamber 218 and food products will be introduced onto belt 224 in this region. The food products will thereafter pass into the cooking of cooking chamber 218. In a steam oven it is desired to create a very high humidity, a droplet free and essentially air-free saturated steam atmosphere which has 100% humidity at a temperature of approximately 212° F., under atmospheric conditions within cooking chamber 218. It has been found to be highly desirable to maintain a very high moisture level in the cooking atmosphere of the oven 210, in order to allow cooking of food products in a shorter amount of time with less weight loss occurring during the cooking process. These advantages are particularly obtained in an atmosphere as described, which has heretofore not been achievable on a consistent and uniform basis. Within cooking chamber 218, a zone of approximately 100% saturated steam at 212° F. is created at ambient atmospheric pressure or one atmosphere, to obtain high rates of heat transfer to food product as it passes through the cooking chamber 218 to maximize product throughput and yield from the cooking process. Food products travel downwardly along a descending belt portion 230 from the cooking chamber 218 to the outlet 222. This belt portion 230 includes a segment which is below the lower extent of cooking chamber 218.

The upper run of conveyor belt 224, comprising portions 226, 228, and 230, provides a path for conveying food products or articles through cooking chamber 218. As will be explained in greater detail later, the length of that portion of this food path that lies within the cooking chamber 218 may be varied by raising and lowering the hood 214. The hood is shown in lowered position in FIG. 3 and in raised position in FIG. 4. Since the position of the conveyor belt 224 and hence the flow path for food articles remains fixed relative to the stationary base 216, and the lower extent of the cooking chamber 218 moves up and down with the hood 214, one achieves maximum cooking length inside chamber 218 by placing the hood 214 in its lower most position shown in FIG. 3, and achieves minimum cooking length inside the cooking chamber 218 by placing the hood 214 in its topmost position shown in FIG. 4. The hood 214 can be positioned anywhere between the upper and lower limits. This will be discussed in further detail with reference to FIG. 7.

Figure 3:
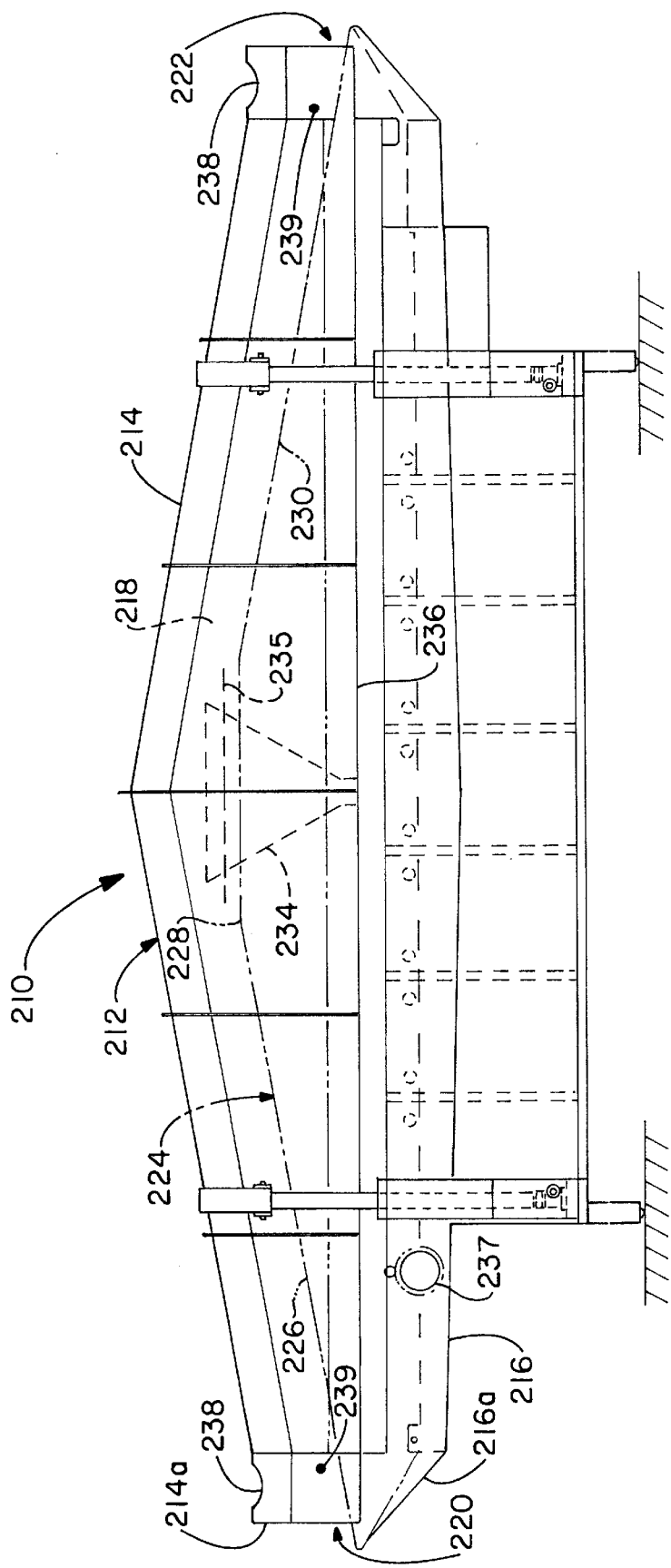
FIG. 3 is a longitudinal sectional view of the cooking oven shown in FIG. 2, with the upper housing in lowered position.
Figure 4:
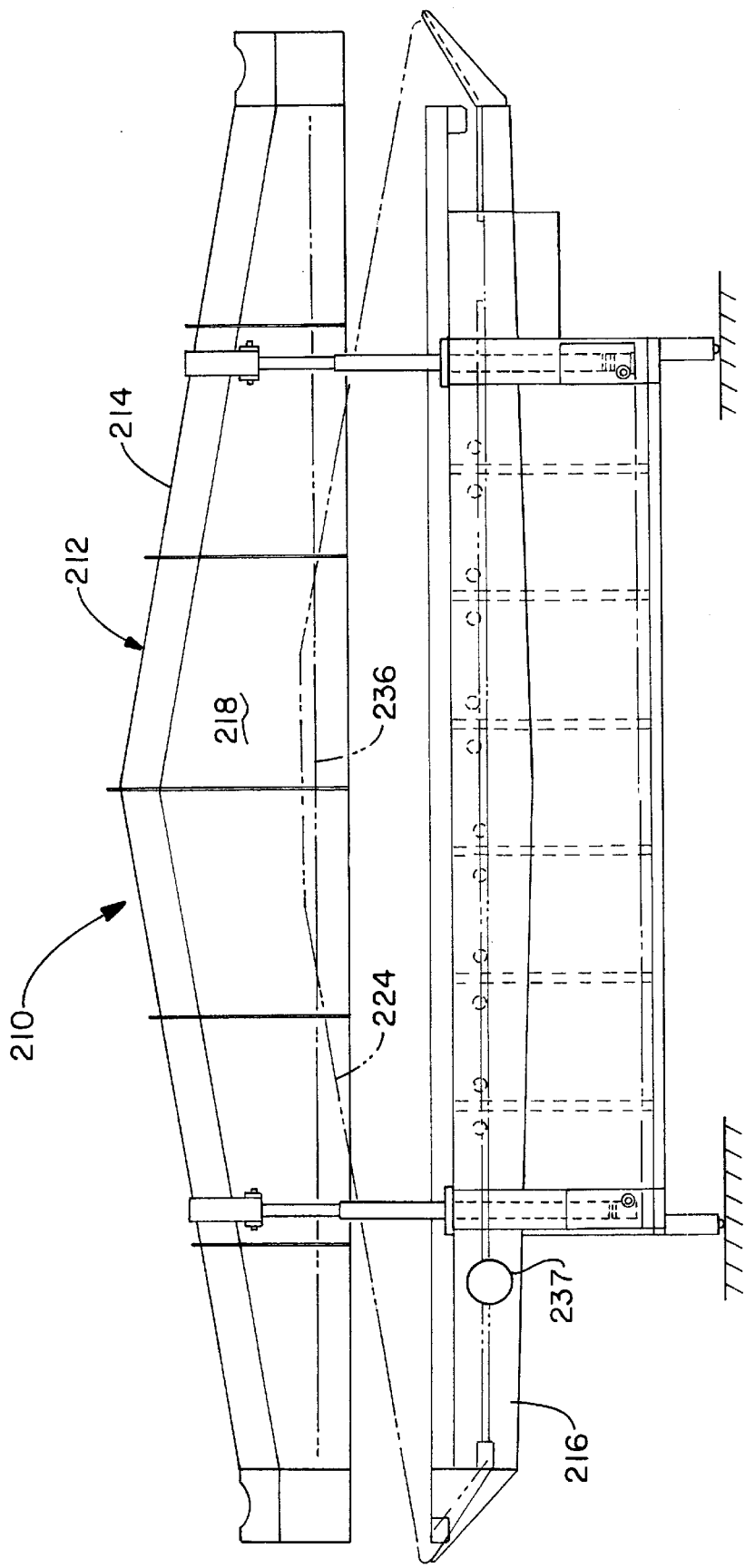
FIG. 4 is a longitudinal sectional view, similar to FIG. 3, showing the upper housing in raised position.
Figure 5:
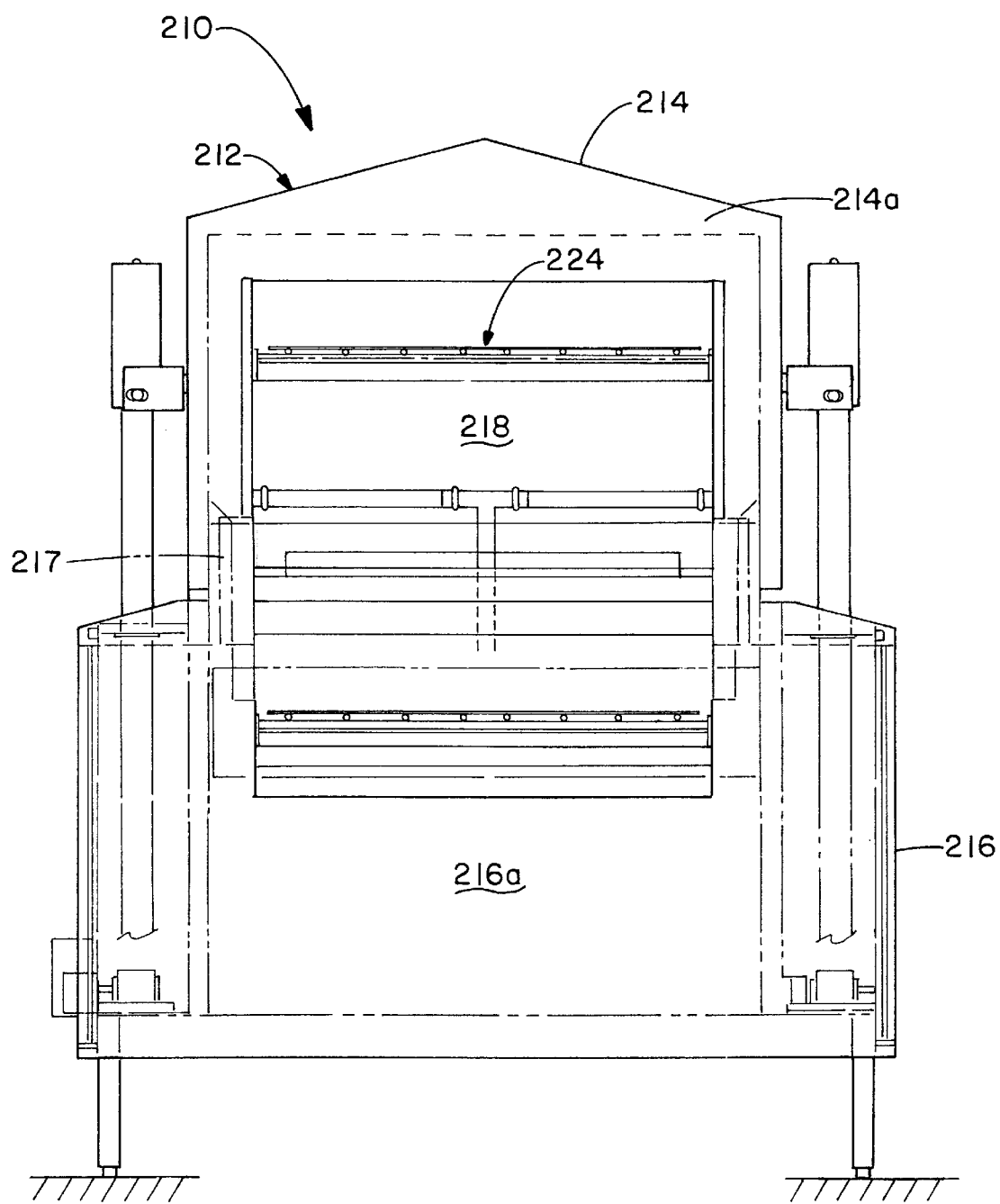
FIG. 5 is an end view of the cooking oven shown in FIG. 2

A source of steam under pressure generally shown at 232 (FIG. 6) supplies steam to steam inlets 234 which will distribute the steam within an upper region of hood member 214. The steam inlets 234 in this embodiment are a pair of generally triangular (or generally fan-shaped) plenums (FIGS. 3 and 6) which extend longitudinally and are mounted equidistantly on opposite sides of the longitudinal axis of the oven. Each plenum has a lower apex at which the steam plenum is connected to a steam supply conduit (to be described in detail subsequently) and a narrow slit opening along an upper side (the side opposite the apex) for discharge of steam into the cooking chamber 218. The configuration of plenums of the steam inlet 234 allow the steam to be introduced into the cooking chamber to spread out within the plenum prior to discharge, and also reduces the velocity of the steam therein. This discharge opening is in an upper portion of the cooking chamber 218 above the middle portion 228 of the upper run of the conveyor belt 224. In the preferred embodiment, the pair of steam inlets 234 are positioned on opposed edges of the chamber 218 to uniformly introduce steam into the cooking chamber. The moisture level within cooking chamber 218 is maintained by injecting steam into the cooking atmosphere in order to substantially fill cooking chamber 218 with 100% saturated steam atmosphere. A feature of the invention is directed to maintaining the highest possible moisture level in the cooking chamber 218 with the minimum amount of steam to make the cooking process cost effective and efficient. To accomplish this in the invention, steam is introduced into the cooking chamber 218 above the conveyor belt 224 in a particular manner. A gentle flow of low pressure (5 p.s.i.g. or lower) saturated steam supplied from the flow regulator 252 is introduced into the cooking chamber 218. The exit velocity of the steam from the plenums 234 is desirably 1000 ft./min. or less, and preferably approximately 800 ft/min. to provide steam input which substantially reduces turbulence in the introduced steam. The reduced turbulence allows the creation of the desired 100% saturated steam within the cooking chamber. To further reduce turbulence in the cooking chamber, the steam flows gently downwardly from steam inlets 234 onto a deflector plate 235, as shown in FIG. 3. The deflector plate 235 further slows the velocity of steam introduced into cooking chamber 218, such that steam gently moves downwardly from its input through the cooking chamber to exhaust ducts (to be described) which are located at the ends of the cooking oven and below the lower most level of the cooking chamber. As the steam settles down and flows toward the exhaust ducts, it drives out air which is initially present (at start up) and thereafter maintains an air-free atmosphere. The gentleness with which steam is introduced minimizes any disruption or flow of steam within cooking chamber 218, and has been found to greatly facilitate maintaining the desired 100% humidity and 212° F. atmosphere created.

The essentially horizontal deflector plate 235 is preferably provided above the center portion of conveyor belt 224 and just below the steam discharge openings in plenums 234, as an aid in gently deflecting incoming steam away from the center portion of the conveyor belt and to diffuse steam essentially uniformly throughout the cooking chamber 218 without channelization.

It is therefore an aspect of the invention to prevent the unwanted escape of steam from the oven as well as to prevent the entry of air into the cooking chamber 218. These goals can be achieved by utilizing the natural tendency of steam to separate from air due to its lower density, wherein steam introduced into hood 214 will be maintained in a leak-proof portion of the enclosure 212 corresponding to the region above the inlet and outlet openings 220 and 222 respectively. As shown in FIGS. 3–5 and 7, the lower extent of the steam is shown at 236, defining the lower limit of the cooking chamber 218 through which food products are made to pass. The product inlet and outlet openings 220 and 222 are the highest level of openings in-the-oven cabinet or enclosure 212, and thus the only place for steam within the cooking chamber 218 to escape from the oven. The lower limit of the cooking chamber is therefore above the openings 220 and 222. To maintain the high moisture level within the cooking chamber 218, introduction of steam from source 232 through steam inlet 234 may be continued after the cooking atmosphere is of approximately 100% saturated steam, to create a very small amount of steam leakage at the highest openings of the enclosure 212. This will ensure that the cooking chamber 218 is substantially filled with steam continuously.

Figure 7:
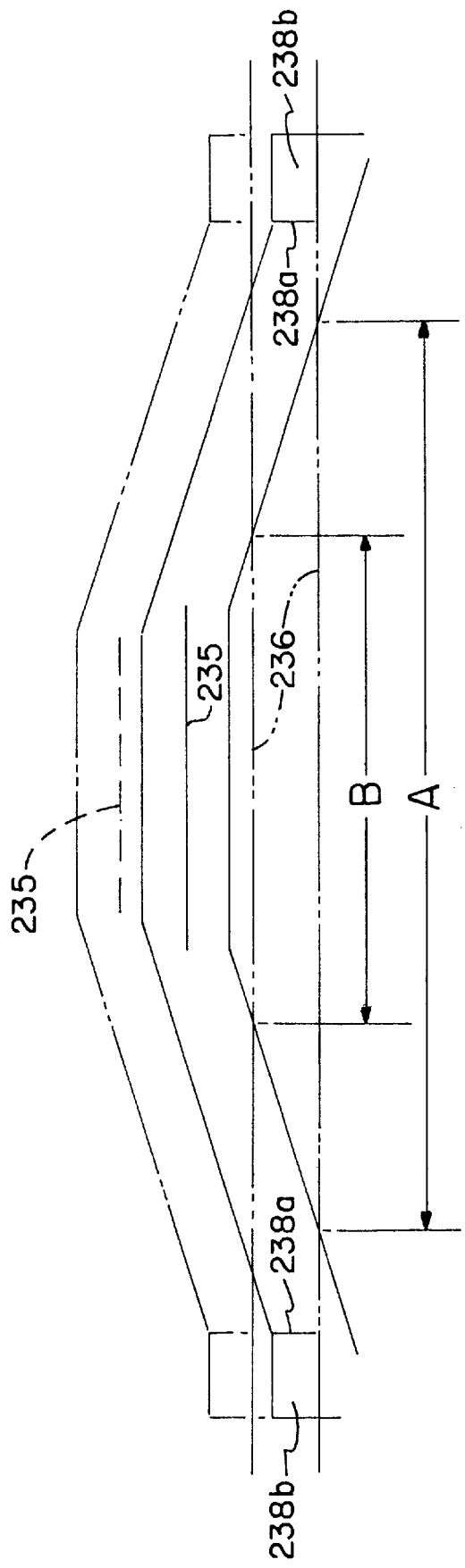
FIG. 7 is a schematic side elevational view of the cooking oven shown in FIG. 2, showing the effective length of the path of a conveyor belt through a cooking chamber when the upper housing member is in lowered position and when the upper housing member is in raised position.

An exhaust stack 238 is provided at each of the inlet and outlet openings 220 and 222 for collection of the small amount of escaping steam. A pair of vertical baffles 238a are provided at each end of the cooking oven 210. These baffles are spaced from the respective end walls 214a and extend downwardly from the top or roof of upper housing member 214 and from side to side, forming exhaust chambers 238b with which the exhaust ducts 238 communicate. The lower most levels of baffles 238a are preferably higher than the upper most level of inlet openings 220 and 222. Broadly, the lower boundary of cooking chamber 218 may be taken as the upper level of openings 220 and 222. More conservatively, especially as shown in FIG. 7, the lower levels of the 238a may be considered as defining the lower limit of cooking chamber. Maintenance of a 100% saturated steam atmosphere above the lower extent of baffles 238a is virtually assured. As should be apparent, the effective length of the conveyor belt run within the cooking chamber is greatest when the upper housing member 214 is at its lowest level (FIG. 3), and is least when the upper housing member 214 is at its highest level (FIG. 4) (see also FIG. 7).

Within or near one or both exhaust stacks 238, there may be provided a temperature or steam sensing means 239, such as a thermocouple. By providing the sensing means at this location relative to any steam loss from the oven, it is possible to use an output signal from the sensor 239 to precisely control the flow rate of steam into the chamber 218 from the steam source 232. The steam flow rate from the openings 220 or 222 can be reduced until only a small amount exits the oven 210, while maintaining the level of steam or steam density constant regardless of product flow into the oven.

Figure 6:
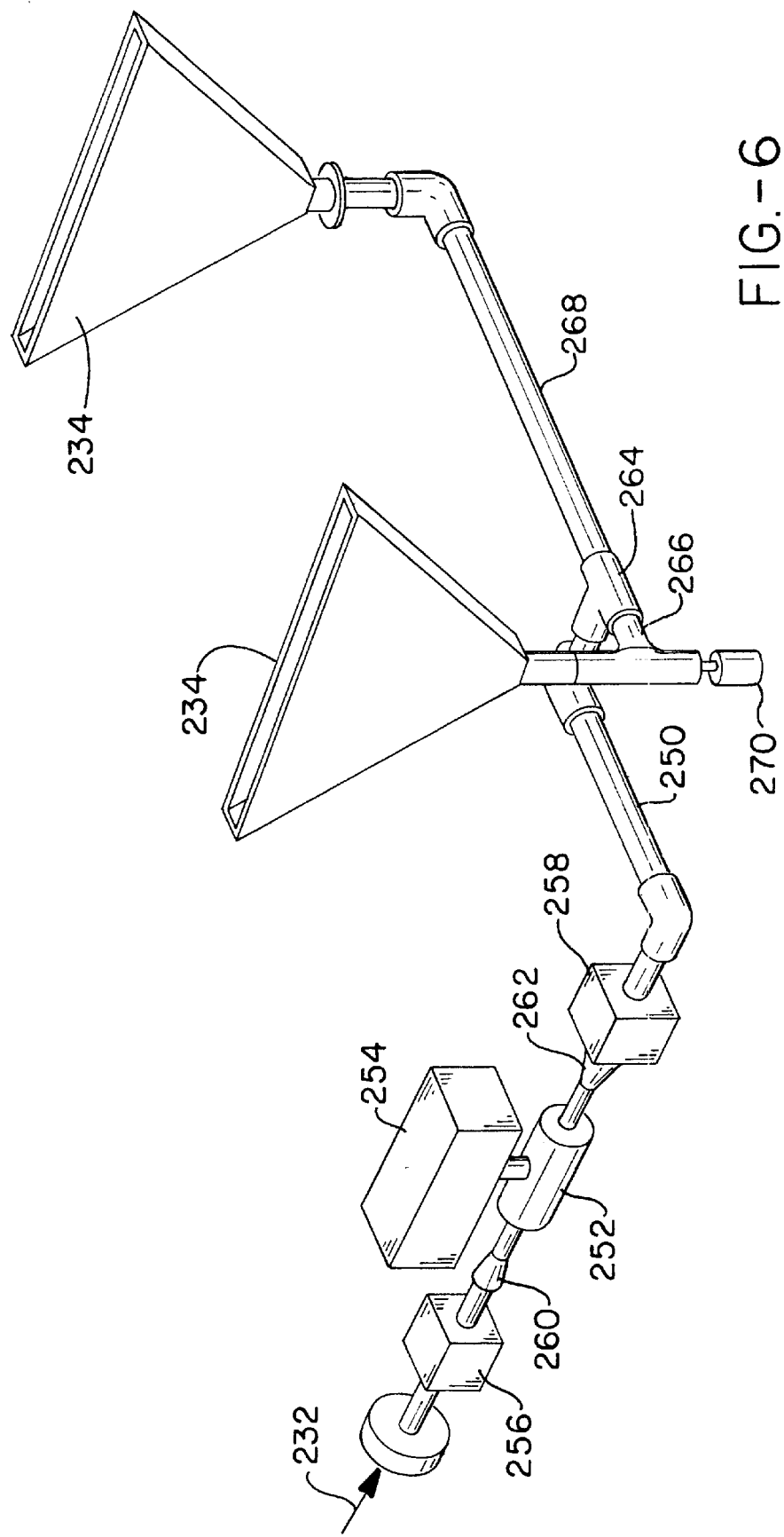
FIG. 6 is a schematic view of a steam supply system for the cooking oven shown in FIG. 2.

A preferred steam supply system is described with particular reference to FIG. 6. Attention is also directed to FIG. 5. Conveyor belt 224 may be made to continuously travel through the oven 210 by means of an adjustable drive similar to that described with respect to FIG. 1. Sprockets, which may be conventional, are provided near the inlet and outlet ends of the oven, i.e., at the beginning of the first portion 226 and at the end of a last portion 230 of the upper run. Mountings for these sprockets may be fixably secured to the base member 216 so that the position of the conveyor belt 224 remains fixed and the upper housing member 214 reciprocates upwardly and downwardly relative to both the base 216 and the conveyor belt 224. A belt cleaning apparatus 237 (FIGS. 3–4) for cleaning the conveyor belt 224 on the return run, may be provided in this embodiment and may be similar to that shown in commonly assigned U.S. application Ser. No. 08/513,422 filed Aug. 10, 1995, now U.S. Pat. No. 5,613,594.

A preferred steam supply system is described with particular reference to FIG. 6. Attention is also called to FIG. 5.

Referring now to FIG. 6, steam from a steam source 232 (previously mentioned) is provided through a primary conduit or pipe 250. The flow regulator or control valve 252 is controlled by a sensor or transducer 254, which senses the temperature of steam in conduit 250, controls the flow of steam through conduit 250. Thus the mass-flow rate of steam is controlled jointly by this transducer 254 and by the previously described sensor 239 located near a steam outlet from the cooking chamber 218. The primary conduit 250 may also include valves 256 and 258, and flow reducers 260 and 262. Steam flowing through primary conduit 250 is caused to branch into two streams to supply the respective plenums 234. To this end, the primary conduit 250 terminates in a tee 264 (shown in FIGS. 5 and 6), to which branch conduits 266 and 268 (FIGS. 5 and 6) are connected. These branch conduits supply steam to respective steam plenums 234. A condensate trap 270 is connected to one of these branch conduits, i.e., to branch conduit 268. The respective first portions of branch conduits 266 and 268, i.e., those that are connected to tee 264, are co-axial and are nearly but not quite horizontal. These portions slope downwardly toward the condensate trap 270, a slope of one inch per foot (a 1:12 ratio) is sufficient for this purpose.

While certain principles of this invention which have been illustrated with particular reference to an elongated cooking oven having a linear conveyor belt, as illustrated in FIGS. 2–7 and also in FIG. 1, these principles may be applied to ovens and conveyor belts of other configurations. Thus, an oven may be of circular shape, for example, having an inlet and an outlet for food at spaced and preferably opposite locations. A cooking chamber having a 100% steam atmosphere is maintained above the uppermost portion of the inlet and outlet. The steam is supplied to the cooking chamber, preferably above the conveyor belt, but in any case in such location that steam may travel downwardly rather than upwardly through that portion of the conveyor belt which carries food articles being cooked. This is important in order to maintain an air-free steam atmosphere. It is also important to provide one or more steam outlets at a location or locations remote from the steam inlets, since some flow of steam (as opposed to condensation of all steam that is not absorbed by food articles being cooked) is provided as an aid to maintaining an air-free and preferably 100% saturated atmosphere.

For cooking of certain food articles (e.g., poultry) it may be desirable to provide a super-heated steam atmosphere rather than a 100% saturated steam atmosphere in a cooking chamber 218. However, exclusion of air from the cooking chamber is important in all cases.

While a super-heated steam atmosphere in the cooking chamber (e.g. 18 or 218) of a cooking oven according to this invention is acceptable and indeed useful for cooking certain types of foods, temperatures below 212° F. (100° C.) should be avoided. A temperature sufficiently high (at least 212° F.) to maintain a 100% steam atmosphere should always be maintained in the cooking chamber.

A cooking oven according to this invention is suitable for cooking a variety of foods, including bagels, breads and other baked goods, shrimp, and poultry. For most cooking applications, the 100% saturated steam atmosphere is preferred. In some cases (cooking of poultry, for example), a super-heated steam atmosphere may be preferable.

Operation of a cooking oven according to this invention is as follows:

In the embodiment of FIGS. 2–7, the upper housing member or hood 14 is moved vertically to a height which will give a food path of desired length through the cooking chamber 218. The food path of desired length is that portion of the upper run (226, 228, and 230) of conveyor belt 224 which lies above the lower limit 236 of the cooking chamber 218. The effect the height of hood 14 on the length of the food path may be seen in FIG. 7. Shown schematically therein, the portion of the food path which lies within the cooking chamber 218, shown at A, is greatest when the hood is at its lowest elevation (shown in FIG. 3), and least when the hood is at its highest elevation, indicated at B (shown in FIG. 4). The hood 214 may be positioned at either of these extremes or anywhere in between. The desired cooking length may therefore be achieved for a particular product, while not modifying the speed of conveyor 224. This allows the apparatus 210 to be used in line with other processing equipment easily and effectively, while allowing variable cooking or dwell times within cooking chamber 218 to be achieved.

To start up the apparatus, steam is passed into the cooking chamber (e.g., 18 or 218) before cooking of food is commenced. This establishes a 100%, 212° F. steam atmosphere in the cooking chamber.

Cooking of food products or articles commences after a 100% steam atmosphere has been established in the cooking chamber. Articles of food are placed on a conveyor belt (e.g., 224) at the inlet of the cooking oven. The food articles are then transported by the conveyor belt upwardly from the inlet into the cooking chamber 218, where they remain for the required residence time sufficient to cook the product in question. Then food articles which are on a continuously moving conveyor belt, descend from the cooking chamber toward an outlet (e.g., 222). The cooked food may be further processed as desired. Variations in cooking time may also be achieved by varying the speed at which a conveyor belt is driven, although this is not generally preferred in a food processing line. A cooking oven according to this invention may also be used for rehydration of certain products, such as fruits, nuts, and seeds.

The oven of the invention allows a cooking atmosphere to be obtained, which is essentially 100% saturated steam at a temperature of 212° F. and pressure of one atmosphere, to enable mass quantities of food products to be quickly and efficiently cooked in a steam atmosphere. The steam atmosphere is maintained at the highest possible moisture content with the minimum amount of steam input into the system. Escape of steam from the oven is substantially prevented, but allowing very small amounts of steam to escape enables precise control of steam flow rate for desired operation of the oven. Although the oven has been defined in terms of simplified illustrated examples and preferred particular embodiments, it is contemplated that various alterations and modifications may be made without departing from the scope of the invention as defined in the appended claims.

What is claimed is:

1. A cooking oven comprising
    (a) a housing defining an enclosure and having an inlet opening and an outlet opening, said enclosure having a cooking chamber in an upper portion thereof above said inlet and outlet openings;
    (b) a continuous conveyor belt for receiving food products to be cooked, said conveyor belt traveling upwardly from said inlet opening into said cooking chamber and then downwardly from said cooking chamber to said outlet opening;
    (c) a steam supply for supplying steam to said cooking chamber, said steam supply including at least one stem inlet in said cooking chamber and including at least one steam deflector positioned relative to said at least one steam inlet in the path of said steam introduced at said inlet;
    whereby said steam supply generates a predetermined steam atmosphere in said cooking chamber;
    wherein said housing comprises a stationary base and a vertically reciprocable hood thereabove, and sealing means co-acting with said base and said hood;
    said conveyor belt having a fixed travel path;
    said cooking chamber having a lower limit which moves up and down with said hood so that the length of the travel path of said conveyor belt through said cooking chamber varies in accordance with the height of said hood.

2. A cooking oven according to claim 1 wherein said at least one steam inlet is positioned above said conveyor belt in approximately the middle of said cooking chamber.

3. A cooking oven according to claim 1, wherein said at least one steam deflector is positioned adjacent said at least one steam inlet, above a portion of said conveyor belt, wherein steam introduced into said cooking chamber from said at least one steam inlet and is directed against said deflector to reduce the velocity of said introduced steam.

4. A cooking oven according to claim 1 wherein said housing is an elongated housing having opposite first and second ends, wherein further said inlet opening is at said first end and said outlet opening is at said second end, and wherein further said conveyor belt is essentially linear.

5. A cooking oven according to claim 1 further comprising a pair of exhaust ducts located at and extending upwardly from said inlet and outlet openings of said housing.

6. A cooking oven according to claim 1, said hood further comprising baffles at each end, said baffles being spaced from respective adjacent endwalls of said housing and extending downwardly from a top portion of said hood and from side to side of said hood, each said end wall and adjacent baffle forming a discharge chamber for steam, and having an exhaust duct communicating with each of said discharge chambers.

7. A cooking oven to claim 1 wherein said steam supply introduces a continuous flow of steam from said at least one inlet to said at least one steam exhaust duct, and wherein a sensor is positioned in said continuous flow of steam from said at least one steam inlet to said at least one exhaust duct for sensing steam conditions and controlling the supply of steam in response thereto.

8. A cooking oven according to claim 1, wherein said at least one deflector comprises a generally horizontal plate positioned in said cooking chamber above a portion of said conveyor belt and adjacent said at least one steam inlet.

9. A cooking oven according to claim 1, wherein said steam supply includes at least one plenum, with said at least one plenum having a first end connected at a lower portion thereof to said steam supply and having a second end, said second end forming said at least one steam inlet for introducing steam into said cooking chamber and having a greater dimension than said first end.

10. A cooking oven according to claim 1, wherein said steam supply includes a source of steam, a steam conduit extending from said source and having therein transducer means for sensing steam conditions and controlling the steam flow rate in response thereto, said steam conduit coupled to at least a pair of plenums, with said plenums positioned on opposite sides of said cooking chamber for introducing steam uniformly into said cooking chamber.

11. A cooking oven according to claim 1 wherein said steam supply includes at least one plenum to which steam under pressure is supplied and which is configured to allow steam entering said plenum to spread out prior to discharge into said cooking chamber and to reduce the exit velocity of said steam prior to discharge into said cooking chamber.

12. A cooking oven according to claim 11, wherein said exit velocity of said steam from said at least one plenum is 1000 ft./min. or less.

13. A treatment apparatus comprising a housing defining an enclosure and having an entrance opening and an exit opening, said enclosure having a treatment chamber in an upper portion thereof above said entrance and exit openings;

a continuous conveyor belt for receiving products to be treated, said conveyor belt traveling upwardly from said entrance opening into said treatment chamber and then downwardly from said treatment chamber to said exit opening;

a steam supply for supplying steam to said treatment chamber, said housing comprising a stationary base and a vertically reciprocable hood thereabove, and sealing means co-acting with said base and said hood, with said treatment chamber having a lower limit which moves up and down with said hood so that the length of the travel path of said conveyor belt through said treatment chamber varies in accordance with the height of said hood, and at least one deflector positioned adjacent said steam supply, wherein steam introduced into said treatment chamber from said steam supply is directed against said deflector to reduce the velocity of said introduced steam.

14. A treatment apparatus according to claim 13, wherein said steam supply includes at least one plenum, with said at least one plenum having an inlet opening connected at a lower portion thereof to said steam supply and having an outlet opening along an upper side, said outlet opening forming a steam inlet for introducing steam into said treatment chamber and having a greater dimension than said inlet opening.

15. A treatment apparatus according to claim 13, wherein said steam supply includes a source of steam, a steam conduit extending from said source and having therein transducer means for sensing steam conditions and controlling the steam flow rate in response thereto, said steam conduit coupled to at least a pair of plenums, with said plenums being connected to said steam conduit and positioned on opposite sides of said cooking chamber for introducing steam uniformly into said cooking chamber.

16. A treatment apparatus comprising a housing defining an enclosure and having an entrance opening and an exit opening;

a conveyor belt traveling from said entrance opening to said exit opening;

a steam supply for supplying steam into said enclosure, said steam supply including at least one plenum to which steam is supplied, and which is configured to allow steam entering said plenum to spread out prior to discharge into said enclosure and to reduce the exit velocity of said steam prior to discharge into said enclosure and wherein at least one steam deflector is positioned adjacent said at least one plenum, wherein steam exiting from said at least one plenum is discharged toward said at least one deflector to reduce the velocity of the introduced steam.

17. The apparatus according to claim 16, wherein said at least one plenum is positioned in an upper portion of said enclosure above said conveyor belt.

18. An apparatus according to claim 16, wherein, said housing comprises a base and a vertically reciprocable hood, such that said hood can be selectively positioned relative to said base at a predetermined height with respect to said conveyor belt.

19. The apparatus according to claim 16, further comprising a control system for controlling said steam supply to introduce a predetermined amount of steam into said enclosure through said at least one plenum.

20. The apparatus according to claim 19, wherein said control system further includes at least one sensor for sensing steam conditions within said enclosure and controlling the supply of steam in response thereto.

21. The apparatus according to claim 16, wherein said steam supply includes at least a pair of plenums, said plenums being connected to a steam source and positioned on opposed sides of said enclosure for introducing steam uniformly into said enclosure.

22. The apparatus according to claim 16, wherein said exit velocity of said steam from said at least one plenum is 1000 feet/minute or less.

* * * * *